US008456954B1

(12) United States Patent
Rikoski

(10) Patent No.: US 8,456,954 B1
(45) Date of Patent: Jun. 4, 2013

(54) HOLOGRAPHIC NAVIGATION

(75) Inventor: Richard J. Rikoski, Alameda, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 318 days.

(21) Appl. No.: 12/802,455

(22) Filed: May 17, 2010

Related U.S. Application Data

(60) Provisional application No. 61/216,566, filed on May 18, 2009.

(51) Int. Cl.
*G01S 15/00* (2006.01)
*G01S 15/89* (2006.01)

(52) U.S. Cl.
CPC ............. *G01S 15/89* (2013.01); *G01S 15/8902* (2013.01)
USPC .......................................................... 367/88

(58) Field of Classification Search
USPC .............................................. 367/88; 359/23
See application file for complete search history.

(56) References Cited

U.S. PATENT DOCUMENTS

| | | | | |
|---|---|---|---|---|
| 5,991,460 A * | 11/1999 | Mitchell | ........................ | 382/278 |
| 6,285,474 B1 * | 9/2001 | Kawano et al. | ................... | 359/29 |
| 2001/0007592 A1 * | 7/2001 | Pu et al. | ......................... | 382/116 |
| 2002/0050942 A1 * | 5/2002 | Grisham | ........................... | 342/25 |
| 2004/0058643 A1 * | 3/2004 | Martin et al. | ................. | 455/3.02 |
| 2005/0052714 A1 * | 3/2005 | Klug et al. | ......................... | 359/3 |
| 2008/0030819 A1 * | 2/2008 | Klug et al. | ....................... | 359/23 |

* cited by examiner

*Primary Examiner* — Isam Alsomiri
*Assistant Examiner* — James R Hulka
(74) *Attorney, Agent, or Firm* — James T. Shepherd

(57) ABSTRACT

A method and apparatus that coherently correlates, in either the frequency domain, or the real domain, an image of a terrain with an extant holographic image of the terrain. Strong correlations indicates matches between features common between the two holograms, or a hologram and an image, and location of the strong correlations indicates position of the features relative to the imager (e.g. a sonar aboard a ship, or a radar aboard a helicopter). Correlation information can be used for navigation.

23 Claims, 1 Drawing Sheet

HOLOGRAPHIC NAVIGATION

CLAIM OF PRIORITY

This application has the priority of U.S. Provisional Patent Application Ser. No. 61/216,566, filed May 18, 2009, which is currently pending.

STATEMENT OF GOVERNMENT INTEREST

The invention described herein may be manufactured and used by or for the Government of the United States of America for governmental purposes without the payment of any royalties thereon or therefor.

FIELD OF THE INVENTION

The invention relates to radiative imaging, such as, for example sonar or radar, and in particular to the coherent correlation and correlatability of such images in feature based navigation. It also relates to radiative sensors for feature based navigation.

BACKGROUND OF THE INVENTION

Underwater terrain based navigation is an unsolved problem due to the difficulty in recognizing terrain. Traditional techniques typically try to estimate position using bathymetry or by recognizing landmarks (the latter called feature based navigation). However, bathymetric estimation is imprecise, and landmark recognition is unreliable, particularly so underwater. Correlation based schemes typically work better in the land robotics community, but traditional coherent sonar images correlate poorly.

SUMMARY OF THE INVENTION

Accordingly, an object of the invention is permit object recognition with precision.

Another object is to do the foregoing underwater.

Another object is permit effective feature based navigation, either on land or underwater.

Another object is to permit effective and precise coherent correlation of radiatively generated images (e.g. by sonar or radar) sufficient to use effectively in feature based navigation.

In accordance with these and other objects made apparent hereinafter, the invention concerns a method and apparatus that coherently correlates, in either the frequency domain, or the spatial or temporal domain, an image of a terrain with an extant holographic image of the terrain. Strong correlations indicates matches between features common between the two images, and location of the strong correlations indicates position of the features relative to the imager (e.g. a sonar aboard a ship, or a radar aboard a helicopter). It is known that synthetic aperture images, such as SAR or SAS (synthetic aperture radar or sonar, respectively), and nearfield real aperture images constitute holograms or quasi-holograms of the terrain scanned, so for the purposes of this patent they will be referred to as holograms. See, E. N. Leith, *Quasi-Holographic Techniques in the Microwave Region*, PROCEEDINGS OF THE IEEE, vol. 59, no. 9, pp. 1305-1318 (September 1971). The inventor has determined that a holographic map of terrain, such as a SAS or SAR image of the terrain, correlates well with other holographic images of the same terrain, or portions of the same terrain, or with real aperture images of the same terrain. This is so because a hologram of the terrain contains all possible real aperture images of it least over some range of angles. Indeed, as is known, any subsection of a hologram is sufficient to reconstruct an image at reduced resolution. The inventor has determined that two holograms of overlapping regions in space with overlapping frequency domain content will correlate with resolution corresponding to the overlapping frequency subsection. This permits object recognition, and hence feature based navigation, by correlating a pre-existing holographic map of a terrain with a subsequently generated hologram or real aperture image of the terrain.

These and other objects are further understood from the following detailed description of particular embodiments of the invention. It is understood, however, that the invention is capable of extended application beyond the precise details of these embodiments. Changes and modifications can be made to the embodiments that do not affect the spirit of the invention, nor exceed its scope, as expressed in the appended claims. The embodiments are described with particular reference to the accompanying drawings, wherein:

DETAILED DESCRIPTION

Figure 1:
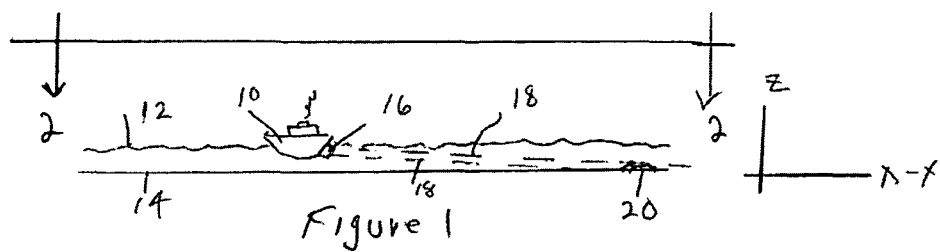
FIG. 1 is a plan view illustrating in situ operation of the invention in a marine environment.
Figure 2:
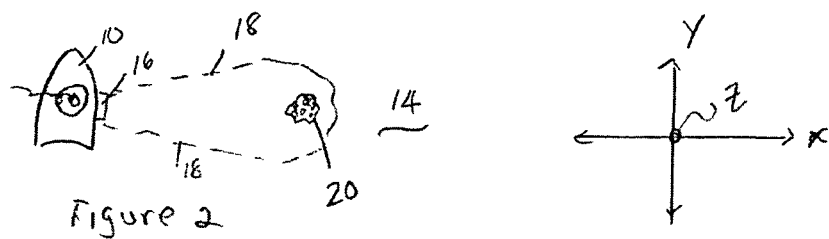
FIG. 2 is a view in the direction of lines 2-2 of FIG. 1, illustrating real aperture imaging of an object.

With reference to the drawing figures, wherein like numbers indicate like parts throughout the several views, FIG. 1 shows a ship 10 located on surface 12 of a body of water having bottom 14. For convenience, FIG. 1 (as well as the other drawing figures, has a set of reference axes x-y-z, in which z is azimuthal altitude above bottom 14, and the x-y directions constitute the plane in which bottom 14 lies. Ship 10 has a sonar, illustrated as a conventional side scanning sonar 16, which could be any of a number of sonar generators-receivers, for example a linear phased array of hydrophones. Sonar 16 scans bottom 14, which has a distinctive feature 20, which could, for example, be a rocky shoal surrounded by a flat, sandy, bottom. Sonar 16 has beamwidth 18, which encompasses feature 20, the latter being better seen in FIG. 2. Echoes from sonar 16 are received back and detected coherently at sonar 16. (By coherently, it is meant that both echo amplitude and phase are detected, not just amplitude intensity.) A processor, preferably a digital computer aboard ship 10, or a distant computer to which sonar 16 is telemetered, records and/or processes the detected echoes. The processor forms a spatial image of the portion of bottom 14 in the form of a histogram whose domain is the x-y coordinates of the portion of the bottom scanned, and whose range is the magnitude and phase of the echoes. This constitutes a real aperture (i.e. that of sonar 16) image of that portion of bottom 14 which was scanned. One can then perform a two-dimensional spatial coherent correlation between the real aperture (echo) image of an area and a pre-existing synthetic aperture sonar (SAS) map of the same area. The term "coherent correlation" as used herein is disclosed in detail in the above-referenced provisional application Ser. No. 61/216,566 from which the instant application claims priority, as well as in U.S. Pat. No. 8,213,740 that is based on patent application Ser. No. 12/454,485, filed May 18, 2009, by the same inventor as the instant application. If the map covers the portion of bottom 14 containing feature 20, then a correlation between the real aperture echo image and the map will be large at the x-y coordinates of feature 20. If the location of feature 20 is known a priori, this will provide an estimate of the position of ship 10 with respect to feature 20, which is to say determines ship location.

As an advantageous alternative to performing a direct correlation, which is computationally intensive, one could transform the real aperture image into the frequency domain by performing a spatial two-dimensional Fourier Transform of the image, preferably by the computationally efficient Fast Fourier Transform. One then has a histogram in which magnitude and phase representation of the image is a function of wave numbers in the x and y directions, $k_x$, $k_y$, respectively. One uses a similarly transformed version of the holographic map and pointwise multiplies the value of one image by the conjugate of the other image for every point in the $k_x$-$k_y$ plane. Inverting the Fourier transform of the product will yield the cross-correlation of the two images, the peak magnitude of which will be centered at a position corresponding to the translation of one image relative to the other.

From the foregoing, and as is well understood by those in sonar, radar, and allied communications arts, convolution in the real domain (here, spatial domain) is the same as multiplication in the frequency domain, and vice versa. Thus use herein of the term correlation comprehends either operation.

Figure 3:
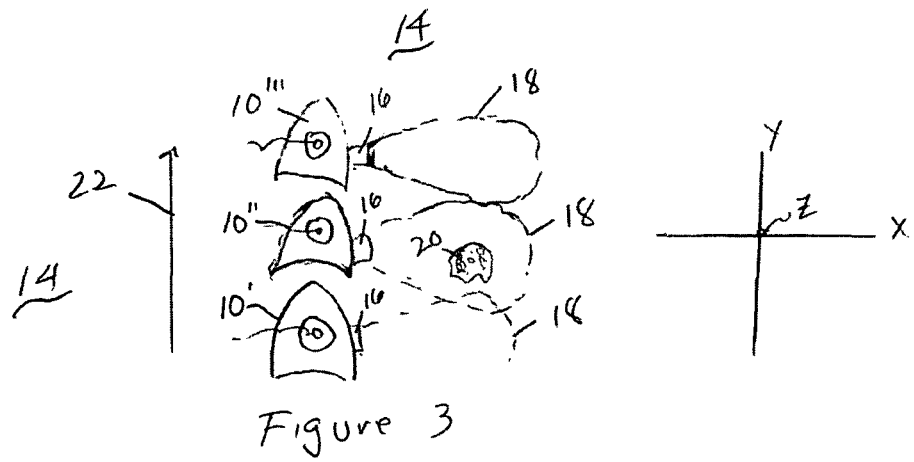
FIG. 3 is a view similar that of FIG. 2, illustrating synthetic aperture imaging of an object.

Because a hologram contains all possible images of an object and hence more information, a pre-existing hologram of the object correlates more strongly with another hologram of the object with a similar range of aspects than with a real aperture image of the object within that range of aspects, and thus yields a correlation with a better signal to noise ratio. FIG. 3 illustrates formation of a SAS image in field. Ship 10 is shown in three different positions, 10', 10'', and 10''', indicating movement of ship 10 in the direction of arrow 22 in FIG. 3. As ship 10 moves, sonar 16 continuously scans bottom 14 with sonar beam 18, the echoes of which are continuously detected and recorded, to form a SAS image, which one can correlate with a pre-existing SAS, or other holographic map of the area, as above described.

If because of noise or distance from a distinctive object the correlation as above described does not produce high enough values to unambiguously or precisely identify position, or if one would like to estimate position prior to or subsequent to direct measurement, one can use the correlation output as input to any of a number of existing estimation algorithms, such as a Kalman filter, a Kalman smoother, an error filter, a particle filter, or a histogram filter, and in this manner improve the predictive value of these algorithms. Depending on the algorithm, the correlation may be passed through a detector, processed into a probability density function, or/and used directly. This is of special importance to submersible vehicles, particularly unmanned robots, whose self-estimate of position can drift because of currents or imprecision of onboard instruments, and whose observations of previously mapped terrain may be intermittent.

As above stated, any two holograms of overlapping regions in space with overlapping frequency domain content will coherently correlate. There are other factors that can cause the correlation to degrade significantly. In FIG. 1, sonar beam 18 is shown at a given angle to bottom 14. This angle is called grazing angle, and to correlate well the grazing angle at which the pre-existing holographic map and the later real aperture or SAS image were made should be substantially the same. An irregularly curving bottom 14 also changes effective grazing angle, and degrades correlation. Moreover, the aspect at which the pre-existing map and the later image were made should be substantially the same, otherwise correlation degrades. Finally, different radiators (such as sonar 16) form different images of the same object, and thus the pre-existing map and subsequent images with which to correlate to the map should be generated using radiatively identical apertures. Alternatively, one can correct for these factors. A scheme for producing aperture invarient images is disclosed in U.S. patent application Ser. No. 12/454,486 by the same inventor, entitled System and Method for Spatially Invarient Signal Detection, filed May 18, 2009, the disclosure of which is incorporated herein by reference. A scheme for aspect compensating echo data is disclosed in a U.S. Patent Application filed simultaneously herewith by the same inventor entitled Apparatus and Method for Compensating Images for Differences in Aspect, Navy Case No. 98,946, the disclosure of which is incorporated herein by reference. A scheme for compensating echo data for variations in grazing angle is disclosed in a U.S. Patent Application by the same inventor filed simultaneously herewith entitled Apparatus and Method for Grazing Angle Independent Signal Detection, Navy Case No. 98,801, the disclosure of which is incorporated by reference herein.

However, absent these corrections, one can mount sonar 16 for rotation about the z axis (FIGS. 2-3) in order to controllably observe object 20. In generating the pre-existing map, a wide-beam sonar is desirable to gather a large amount of information in the synthetic aperture image. In generating the later image or hologram, one can similarly use beams of various widths depending on the scenario. With no heading information, a single omni-directional sonar can be used. Because such a system will only observe a small portion of the information in the hologram, and because it will observe terrain and aspects not in the hologram, both the image and the hologram will contain excess information that acts as noise in the correlation process. Heading information may be advantageously combined with a wide but also with limited beam to similarly increase image information, and thus the likelihood of correlation with the map. The best possible correlation is achieved when the latter beam is the same width as the one which generated the map and when the beam is oriented in the same direction as the mapping beam, as this minimizes uncorrelatable information, i.e. noise. However, it may make sense to broaden the beam by some amount corresponding to the relative orientation uncertainty between the beam and the map so that the entire map is contained in the beam. Conversely, one can use a beam which is narrower than the mapping beam to generate the image/hologram. This minimizes the excess information generated by the navigating sonar, but also results in more excess information being contained in the prior map. Additionally, the overall reduction in information increases net ambiguity, but this may be improved by an increased signal to noise ratio (especially in noisy environments, where a more directional receiver is able to reject noise sources). If the extent and orientation of the narrow beam are known, the excess information can be removed from the hologram prior to correlation to increase the signal to noise ratio. For example, if, in FIG. 2, beam 18 were not much wider in the x-y direction, than the physical extent of object 20, the resultant image will consist predominantly of information about object 20, and, upon scanning object 16, will correlate strongly with information in the pre-existing map about object 16, and correlate little with the remaining information in the map, thus reducing noise in the measurement.

As stated above, sonar 16 can be, for example, a phased array containing one or more hydrophones, which can act as both radiator and echo detector. However, the demands on sonar 16 are greater in transmission than reception, and one can employ a simple receiver separate from the sonar transmitter. In this case, the receiver can be as simple as a single rectangular element. If this element has dimension D and observes an object such as 20 at range r, the receiver's across range resolution is approximately $r\lambda/D$, where $\lambda$ is sonic wavelength. If such a single element is used for holographic navigation, and the transmitter has a similar beampattern, the resolution is approximately $D/2$.

In practice, a large range of sensors and platforms could advantageously use the foregoing scheme, for example autonomous underwater vehicles (AUVs), or submarines or other submersibles with real or synthetic aperture sonars. So too could unmanned aerial vehicles (UAVs), or airplanes, helicopters, or spacecraft with real or synthetic aperture radars like that currently on the Space Shuttle or satellites.

Likewise, although coherent correlation typically involves both the magnitude and the phase of the image, the coherent correlation can be performed using phase information and scaled amplitude or phase information alone.

Additionally, although the typical case involves using a hologram as a prior map, with navigation later performed using either a real aperture image or a hologram, the order could be reversed, such that a system with a holographic sensor could navigate relative to prior real aperture images of known position.

The invention has been described in what is considered to be the most practical and preferred embodiments. It is recognized, however, that obvious modifications to these embodiments may occur to those with skill in this art. Accordingly, the scope of the invention is to be discerned from reference to the appended claims, wherein:

I claim:

1. A method for use in vehicle navigation, comprising the steps of:
    providing a pre-existing holographic map of an area in which a vehicle is adapted to navigate, said holographic map identifying features in the area whose geographic locations are known;
    irradiating a portion of the area using a projector mounted on the vehicle as the vehicle traverses the area, wherein at least one of said features in the area so-irradiated generates echoes;
    receiving said echoes at a receiver on the vehicle;
    processing said echoes at a processor to form an image of said at least one of said features in the area so-irradiated; and
    coherently correlating said image with at least a portion of said holographic map wherein correlations to said at least one of said features in the area so-irradiated identify the geographic locations associated therewith to thereby indicate a geographic location of the vehicle.

2. The method of claim 1, wherein said image is a real aperture image of said at least one of said features in the area so-irradiated.

3. The method of claim 2, wherein said receiving of said echoes is done with a physical aperture substantially identical to the aperture used in the making of said holographic map.

4. The method of claim 3, wherein said receiving of said echoes, and said making of said holographic map, are done at substantially the same aspect.

5. The method of claim 3, wherein said receiving of said echoes, and said making of said holographic map, are done at substantially the same grazing angle.

6. The method of claim 2, wherein said coherently correlating comprises pointwise multiplication of the Fourier Transforms of said image and said holographic map.

7. The method of claim 1, wherein said image is a synthetic aperture image of said at least one of said features in the area so-irradiated.

8. The method of claim 7, wherein said receiving of said echoes is done with a physical aperture substantially identical to the aperture used in the making of said holographic map.

9. The method of claim 8, wherein said receiving of said echoes, and said making of said holographic map, are done at substantially the same aspect.

10. The method of claim 8, wherein said receiving of said echoes, and said making of said holographic map, are done at substantially the same grazing angle.

11. The method of claim 7, wherein said coherently correlating comprises pointwise multiplication of the Fourier Transforms of said image and said holographic map.

12. A system for use in vehicle navigation, comprising:
    a pre-existing holographic map of an area in which a vehicle is adapted to navigate, said holographic map identifying features in the area whose geographic locations are known;
    a radiation projector adapted to be disposed on a vehicle navigating through an area, said radiation projector irradiating a portion of the area as the vehicle traverses the area, wherein at least one of said features in the area so-irradiated generates echoes;
    a receiver adapted to be disposed on the vehicle for receiving said echoes; and
    a processor coupled to said receiver for forming an image of said at least one of said features in the area so-irradiated and for coherently correlating said image with said holographic map wherein correlations to said at least one of said features in the area so-irradiated identify the geographic locations associated therewith to thereby indicate a geographic location of the vehicle.

13. The system of claim 12, wherein said image is a real aperture image of said at least one of said features in the area so-irradiated.

14. The system of claim 13, wherein said receiver comprises a physical aperture, said physical aperture being adapted to perform said receiving, said physical aperture being substantially identical to the aperture used in the making of said holographic map.

15. The system of claim 14, wherein said radiation projector and said receiver are disposed effective to generate said echoes at substantially the same aspect as the aspect used in said making of said holographic map.

16. The system of claim 14, wherein said radiation projector is disposed effective to irradiate said portion of the area at substantially the same grazing angle used to generate said holographic map.

17. The system of claim 13, wherein said coherently correlating said image with said holographic map by said processor comprises pointwise multiplication of the Fourier Transforms of said image and said holographic map.

18. The system of claim 12, wherein said image is a synthetic aperture image of said at least one of said features in the area so-irradiated.

19. The system of claim 18, wherein said receiving of said echoes by said receiver is done with a physical aperture substantially identical to the aperture used in the making of said holographic map.

20. The system of claim 19, wherein said receiving of said echoes, and said making of said holographic map, are done at substantially the same aspect.

21. The system of claim 19, wherein said receiving of said echoes by said receiver, and said making of said holographic map, are done at substantially the same grazing angle.

22. The system of claim 18, wherein said coherently correlating said image with said holographic map by said processor comprises pointwise multiplication of the Fourier Transforms of said image and said holographic map.

23. The system of claim 12, wherein said radiation projector and said receiver are rotationally mounted effective to permit said irradiating to be done at a preselected aspect.

* * * * *